United States Patent
Griffin et al.

(10) Patent No.: US 11,012,242 B1
(45) Date of Patent: May 18, 2021

(54) SYSTEMS AND METHODS FOR TRUSTED CHAIN CODE SYSTEM

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

(*) Notice: Subject to any disclaimer, the term of this patent is extended or adjusted under 35 U.S.C. 154(b) by 384 days.

(21) Appl. No.: 16/147,372

(22) Filed: Sep. 28, 2018

(51) Int. Cl.
*H04L 9/32* (2006.01)
*H04L 9/06* (2006.01)

(52) U.S. Cl.
CPC .......... *H04L 9/3247* (2013.01); *H04L 9/0643* (2013.01); *H04L 9/3213* (2013.01); *H04L 9/3297* (2013.01)

(58) Field of Classification Search
CPC ... H04L 9/3247; H04L 9/3297; H04L 9/3213; H04L 9/0643
USPC ......................................................... 713/178
See application file for complete search history.

(56) References Cited

U.S. PATENT DOCUMENTS

| | | | | |
|---|---|---|---|---|
| 10,693,658 B2* | 6/2020 | Jacobs | ................. | H04L 9/3255 |
| 10,848,315 B2* | 11/2020 | Watanabe | ............. | H04L 9/3226 |
| 2017/0046469 A1* | 2/2017 | Rao | ........................ | G06F 30/398 |
| 2017/0324711 A1* | 11/2017 | Feeney | .................. | H04L 9/3247 |
| 2018/0205555 A1* | 7/2018 | Watanabe | ............. | H04L 9/3247 |
| 2019/0043048 A1* | 2/2019 | Wright | ................... | G06Q 20/10 |
| 2020/0193428 A1* | 6/2020 | Feng | .................... | G06Q 20/407 |

OTHER PUBLICATIONS

"Visual Studio 2017 Documentation". 1337 pages.
Ethereum, "Solidity Documentation Release 0.5.0", Sep. 27, 2018. 213 pages.

* cited by examiner

*Primary Examiner* — Teshome Hailu
(74) *Attorney, Agent, or Firm* — Foley & Lardner LLP

(57) ABSTRACT

Systems, methods, and apparatuses for generating a trusted chain code ("TCC") message. The method includes receiving, by a computing system, an agreement message between a first entity and a second entity. The agreement message may be formatted as a smart contract whose execution causes a transfer of value in response to at least one of an occurrence of an event or a fulfillment of a condition. The smart contract includes chain code that corresponds to computer language to execute and corresponds to at least one of the occurrence of the event or the fulfillment of the condition. A chain code manifest is generated. The chain code manifest includes a hash of the chain code of the smart contract. A TCC message is generated including at least the smart contract and a digital signature on at least the chain code manifest. The TCC message is posted to a distributed ledger.

32 Claims, 4 Drawing Sheets

TCC Message = SignedData { LegalProse, Signed( Hash(Legal Prose), Chain Code Manifest), TST, SD1, SD2 }

FIG. 3A

TCC Message = SignedData { S( SD2 ), Signed( Hash(S( SD2 )), TST ) }

FIG. 3B

TCC Message = SignedData {(SD1), (SD2), Signed( Hash(S(SD1), Hash(S(SD2)), TST )}

FIG. 3C

SYSTEMS AND METHODS FOR TRUSTED CHAIN CODE SYSTEM

TECHNICAL FIELD

The present application relates generally to systems and methods for distributed ledgers and smart contracts.

BACKGROUND

A distributed ledger, such as a blockchain, is a series of signed, hash-linked, append-only, timestamped blocks, each block containing arbitrary data. When viewed as a linked-list data structure, a distributed ledger is a limited data "stack" whose operations only allow users to "push" blocks onto the top. Users are not allowed to modify blocks or to "pull" blocks off of the top. Each new block that is added is appended to the topmost block in the stack. A new block links back to the former top-of-stack block by including a hash (e.g., a smaller mathematical representation) of the preceding block in the new block and binding this hash to the new block under a digital signature. The blocks of a distributed ledger may contain a variety of information, such as transactions, agreements, contracts, documents, and so on.

Smart contracts are self-executing contracts with the terms of the agreement being written into lines of code. The code and the agreements contained therein may exist across the distributed ledger. The smart contract may be configured to execute chain code (e.g., computer programs used to automate processing associated). Chain code may be used to automate enforcement of terms in a smart contract that is stored on or through the distributed ledger. The decentralized ledger may also store and replicate the document giving the smart contract certain security and immutability. The smart contract is a type of program that runs code and (at some point and/or conditions) the program automatically validates a condition and automatically determines how the condition affects the terms of the smart contract. Code signing may be used to gain assurance that the code has not been modified and that it comes from a trusted source. Code signing is a cryptographic technique that provides assurance of the integrity and origin authenticity of an instance of executable programming language code.

SUMMARY

One embodiment relates to a method of generating a trusted chain code ("TCC") message. The method includes receiving, by a computing system, an agreement message between a first entity and a second entity. The agreement message may be formatted as a smart contract whose execution causes a transfer of value in response to at least one of an occurrence of an event or a fulfillment of a condition. The smart contract includes chain code that corresponds to computer language to execute and corresponds to at least one of the occurrence of the event or the fulfillment of the condition. A chain code manifest is generated. The chain code manifest includes a hash of the chain code of the smart contract. A TCC message is generated including at least the smart contract and a digital signature on at least the chain code manifest. The TCC message is posted to a distributed ledger. The execution of a portion of the chain code in response at least one of the occurrence of the event or the fulfillment of the condition is validated against corresponding chain code in the chain code manifest.

Another embodiment relates to a system. The system includes a processor and a non-transitory machine. The non-transitory machine includes readable medium with instructions stored thereon. When executed by the processor it causes the system to receive an agreement message between a first entity and a second entity. The agreement message may be formatted as a smart contract whose execution causes a transfer of value in response to at least one of an occurrence of an event or a fulfillment of a condition. The smart contract includes chain code that corresponds to computer language to execute and corresponds to at least one of the occurrence of the event or the fulfillment of the condition. A chain code manifest is generated. The chain code manifest includes a hash of the chain code of the smart contract. A trusted chain code ("TCC") message is generated including at least the smart contract and a digital signature on at least the chain code manifest. The TCC message is posted to a distributed ledger. The execution of a portion of the chain code in response at least one of the occurrence of the event or the fulfillment of the condition is validated against corresponding chain code in the chain code manifest.

BRIEF DESCRIPTION OF THE DRAWINGS

FIGS. 3A-3C are a schematic of generated TCC messages, according to example embodiments.

DETAILED DESCRIPTION

Figure 1:
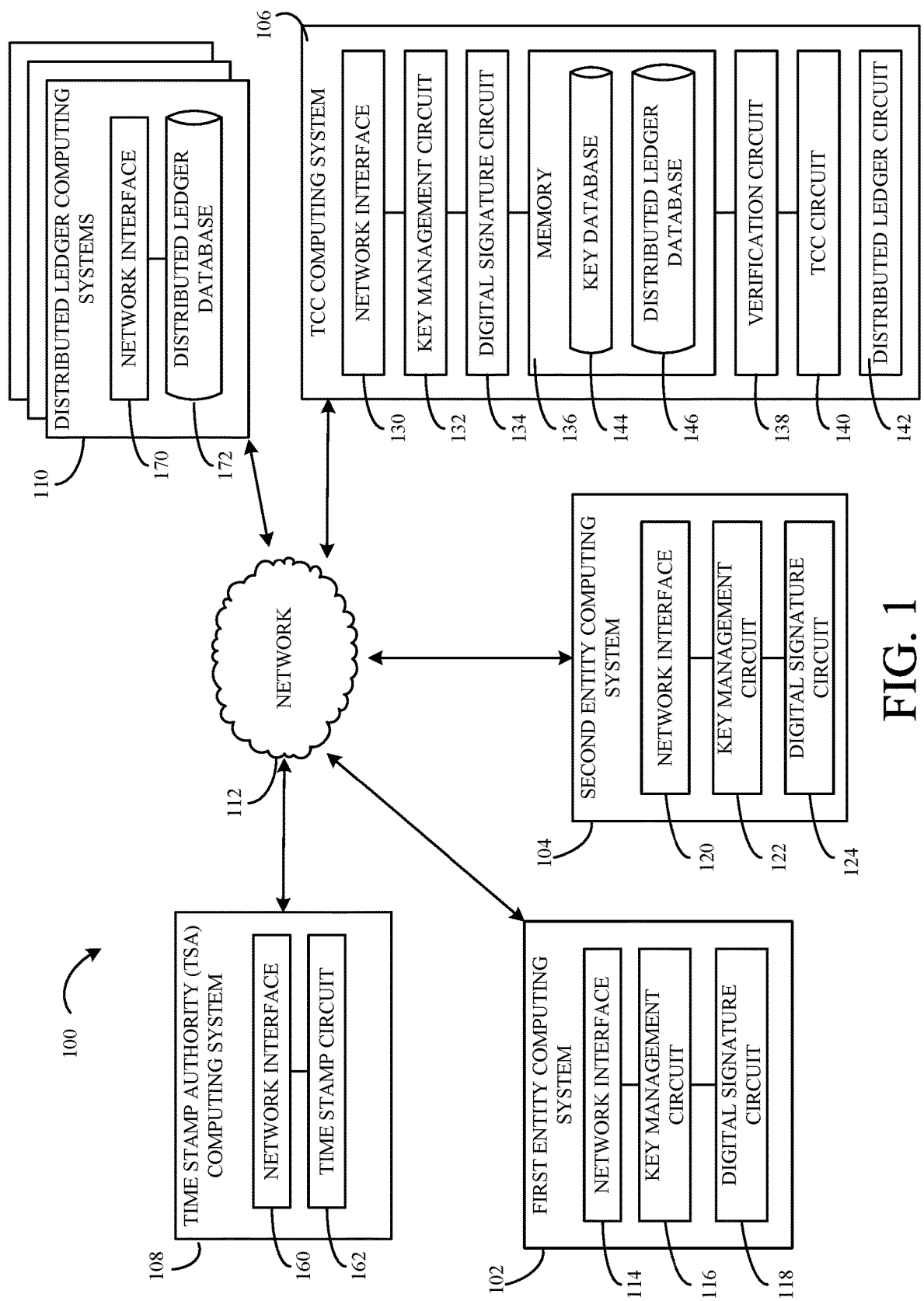
FIG. 1 is a schematic diagram of a Trusted Chain Code (TCC) system, according to an example embodiment.

Referring to the figures generally, various systems, methods, and apparatuses for implementing a TCC system that cryptographically binds the legal prose of the smart contract with the chain code to provide a third party assurance in the origin authenticity and data integrity of the chain code and legal prose of the smart contract. The TCC system includes a system and method for creating a trusted list of chain code elements that can be signed by one or more TCC system stakeholders and for detecting any changes made to the chain code prior to the execution of the chain code or other portions of the smart contract. In some embodiments, the TCC message includes a smart contract as the content of a Cryptographic Message Syntax (CMS) (e.g., SignedData message) that includes attributes of a time stamp token and a chain code manifest cryptographically bound to the legal prose of the smart contract. In some embodiments, the actual agreed terms of the smart contract, including the legal prose and chain code, are bound under a digital signature. Generally, the smart contract may contain chain code, legal prose in plaintext, metadata, timestamps, credentials, authentication information, and similar information that relate to the generation, formation, exchange, and/or completion of an agreement.

The cryptographic techniques used to create a TCC message may require the TCC system, specifically a TCC computing system, possesses a pair of cryptographic keys: a public key and a private key. In some embodiments, the parties to the agreement of the smart contract may be required to possess a pair of cryptographic keys. For example, each key may be a very large prime number or related to a very large prime number. Each public/private key pair is selected such that a message encrypted with one of the keys can only be decrypted with the other key in the key pair. In general, a public key is made public (e.g., generally accessible and available to the public), while a private key is kept private to just the owner of the public/private key pair. Among other things, public/private key pairs may be used to digitally sign content. As an illustration, a party wanting to certify that a message has been created by the party may use a signing algorithm configured to create, using the message and the party's private key, a digital signature associated with the party. Further, the owner of a key pair may have a digital certificate that includes information about the owner's public key and a digital signature of an entity (e.g., an issuing certificate authority) that has verified the certificate's contents such that the owner may use the certificate to prove ownership of the public key. As such, the party's digital signature can subsequently be verified by a third party using a signature verifying algorithm with the message, the public key for the party (which the third party retrieves from the party's digital certificate) and the digital signature.

Accordingly, the required parties provide digital signatures in the TCC using their respective public keys of their public/private key pairs. The parties then create and sign one or more SignedData messages indicating whether the parties have reached a consensus agreement. Additionally, using the indirect signature ability of SignedData type messages (e.g., based on the ability to sign a hash of the content, rather than directly signing the content), the parties may demonstrate consensus by signing a SignedData message without including sensitive information in the message itself. An "indirect signature" describes signing a hash of the content of the SignedData message, usually in a signed attribute of the message. The TCC for the parties may be included as an attribute in the SignedData consensus agreement message or, alternatively, may be stored in a database or directory and associated with the SignedData message. Regardless, a third party may verify the signatures of the required parties, and thus whether a consensus agreement has been reached, using the digital signature for the parties in the TCC. The SignedData message may further be posted on a distributed ledger to memorialize whether the parties reached the consensus agreement. However, because the content of the SignedData message is indirectly signed, sensitive information may be kept private between the parties to the agreement.

As used herein, the term "chain code" refers to computer programs used to automate processing associated with events that occur during performance of a smart contract. For example, the chain code may be lines of code, commands, and/or programs associated with transfer of value, transfer of assets, or other agreements between two or more parties. As will be appreciated, because the chain code constitutes a part of the terms of a smart contract, the chain code must be relied upon to remain unchanged over the lifetime of a smart contract. In some implementations, the chain code may be referred to as a smart contract instance. The chain code may include, for example, JavaScript, C code, Java Code, or other computing languages.

As used herein, the "chain code manifest" refers to a manifest that includes one or more hashes of chain code. In that way, each portion of the chain code that includes a hash in the manifest may be used to determine any changes to that specific portion of the chain code. In other words, a change to chain code that has a corresponding hash in the chain code manifest—bound and protected under a digital signature—would be detectable by comparing the hash of the compromised (e.g., changed) chain code to the hash of the original (e.g., unchanged) chain code. In some embodiments, the chain code manifest itself is hashed (e.g., a hash of a collection of hashes or as a hash of the entire chain code unhashed) to provide data integrity and assurance that no chain code has been removed or added to the chain code manifest at a later time. In those embodiments, the chain code manifest may be hashed and stored in a SignedData message (and/or attributes) or within a time stamp token. The chain code manifest may include Uniform Resource Identifier (URI) links that point to documents and/or associated chain code that might point to other documents and/or chain code that are all hashed using a hashing function. The chain code manifest may also include other supporting smart contract components such as the security policy and practices (or triples containing their identifiers, hashes, and locations) for the smart contract host, the time stamp service provider policy and practices (or triples containing their identifiers, hashes, and locations), the certificate authority policy and practices (or triples containing their identifiers, hashes, and locations) and any service level agreement (SLA) or other supporting or relevant smart contract components (or triples containing their identifiers, hashes, and locations), whether these are use directly in the execution and management of the smart contract as computer programs or for some other purpose.

As used herein, "legal prose" refers to the language and terms of an agreement between two or more parties, outlining conditions and terms and actions in response to those conditions and terms. The legal prose may be tagged, plain text or binary configuration files that are part of a given contract that are not signed. These might provide important parameters to other programs in the system that affect the operation and behavior of the smart contract. There may be legal prose in document, portable document, or other file formats that also form part of a smart contract. Even when a component of the smart contract has been signed, its signature does not provide any assurance that the component is part of any given smart contract.

As will be readily apparent, a wide variety of file types may be used as part of a smart contract. In some embodiments, there may be human readable script files that invoke executable files and executable files that invoke shared library procedures. A smart contract may contain configuration files that allow code to be customized for a given contract or environment to facilitate code reuse. Human readable configuration files might also play a role in smart contract execution. As will be readily apparent, not all smart contract components are files suitable for the application of code signing techniques. For example, a human readable file created by a local systems programmer or administrator that is processed by a program, will not expect a digital signature to occur within the file and may disrupt the execution of the file. As a further example, a configuration file that is modified by a customer to control how a provider executable file behaves or the options it uses when executed would invalidate a provider (e.g., TCC system) digital signature.

The various embodiments of the TCC system abrogate the issues with the current privacy and preservation systems for distributed ledger agreements and smart contracts. As described herein, the TCC system allows for the use of cryptographic techniques to generate a TCC message, such as X9.73 SignedData type messages, to detect changes in the code used as part of a smart contract. Additionally, the TCC message is configured to incorporate agreed changes (e.g., amendments) made to code chain elements by relying parties. This TCC message may be used by one or more parties to indicate what agreement two or more parties have reached with respect to terms and conditions (e.g., the legal prose) and the chain code (e.g., executed code) and determine as to the validity, acceptability, and/or state of a set of transactions recorded on a distributed ledger (e.g., a blockchain) or cloud environment associated with regular contract or smart contract processing. Consensus of a pending chain code may be demonstrated, for example, using a SignedData message that binds the chain code manifest and legal prose under a digital signature.

Current methods may implement code signing to provide assurance that a given piece of chain code has not been tampered with. However, code signing does not provide assurance that a piece of chain code, valid signature or not, is the same chain code agreed upon by both parties when forming the smart contract. Conversely, the system and methods described in the present application bind the chain code and legal prose agreed upon at the formation of the smart contract to the smart contract in a TCC message to provide assurance. In other words, a valid code signature will not provide assurance that the pending chain code is the chain code that was agreed in the smart contract. Conversely, the TCC message that binds the chain code to the contract under a digital signature provides such assurance. Additionally, code signing is configured to only implement a direct signature on the chain code. The direct signature travels with the chain code and is a part of the chain code, thus code signing certain XML, files, Python scripts, image files, and/or sound files might directly interfere with that files execution. Conversely, the TCC system allows for an indirect signature on the chain code, allowing for applying a digital signature over the chain code that does not interfere with the execution of the chain code.

Expanding upon the technical advantage of the present systems, methods, and apparatuses for a TCC system, a TCC message may be demonstrated using a cryptographic container that contains an indirect signature of the content. For example, the ordinary content attribute of the SignedData type, where content would typically be store, is optional and thus the content of the SignedData type may be detached. Thus, the parties may sign a hash of the content at issue, rather than the content itself, in a SignedData message (e.g., which is stored in the signed attributes of the SignedData message). In this way, the cryptographic container may be posted to a distributed ledger without any potentially sensitive content included, thus preserving the privacy of the agreement, but a third party having access to the content, the digital certificates for the parties, and the cryptographic container would still be able to verify that consensus was or was not reached between the parties and that the pending chain code was the original agreed upon chain code. Additionally, this approach is more easily implemented than using secured cryptographic containers for each agreement or step of the agreement because the parties are able to post just the final cryptographic container indicating the TCC message, which eliminates complexity to the process. Moreover, the parties would be able to use the TCC scheme described herein to show that messages posted to a distributed ledger allegedly showing that pending chain code is the chain code that the parties reached a consensus on.

Further, the methods and systems described herein alleviate the strain on processing power and memory components currently required to manage, store, and validate pending chain code. Embodiments described herein utilize a less strenuous processing method through an indirect signature method and the technique used to generate and validate chain code. The TCC system provides an automated means of ensuring that all relying parties can detect any changes made to the chain code programs used to implement the terms of a smart contract over the lifetime of the agreement. The TCC system further allows the system executing a smart contract to validate that chain code that is about to execute has not been modified since the smart contract was agreed. Beneficially, the TCC system contains all relevant information and is trustworthy enough for third party (e.g., legal and regulatory) to use and prevent execution of chain code that has not been agreed by contract stakeholders. Additionally, the TCC system supports the signing of elements included in a smart contract by the stakeholders.

With many current distributed ledgers, mining, proof of work processing, or proof of stake processing is required to achieve consensus. As an illustration, the consensus mechanism used by Ethereum® requires mining, which involves solving a difficult mathematical puzzle referred to as a proof of work problem, to gain a right to post a block to a blockchain. These techniques cannot scale to support commercial use in high speed and high-volume transaction systems because they are designed to cause delay in posting blocks to the ledger, and because they require extensive amounts of energy. Many decentralized distributed ledger systems (e.g., permissionless distributed ledger systems, such as Ethereum® or Bitcoin, which are available to a large number of users) face similar issues. As another illustration, the Visa® payment network is believed to do 45,000 peak transactions per second on its network during holidays and averages hundreds of millions of transactions per day. Currently, Bitcoin supports around seven transactions per second with a one-megabyte block limit. Thus, to post transactions to a decentralized distributed ledger is a costly and time-consuming process.

The TCC message includes the functioning smart contract and a digitally signed legal prose and chain code manifest stored within a single message. As will be appreciated, the TCC message and TCC system allows for fewer items posted to a distributed ledger according to this approach, meaning that limited mining, proof of work processing, or proof of stake processing is required. This, in turn, means that the present systems, methods, and apparatuses for distributed ledger consensus agreements allow for consensus to be demonstrated on a distributed ledger in a faster and more cost-effective way. Further, because this approach is computationally simpler than traditional approaches for demonstrating consensus on a distributed ledger, this approach requires lowered storage and processing requirements from the computing systems used by the parties to demonstrate consensus, thereby freeing up bandwidth and processing capability for other functions. This also allows the present approach to be more easily scaled to a commercial level.

Distributed ledgers may alternatively be centralized (e.g., permissioned distributed ledgers, such as Hyperledger® Fabric and R3 Corda, where a centralized entity decides and attributes the right to individual peers to participate in the write or read operations of the distributed ledger), and centralized distributed ledgers often have better performance in terms of latency and throughput than decentralized distributed ledgers. Some permissioned distributed ledgers also do not require proof or work or proof of stake processing. However, centralized distributed ledgers also limit the users who read and write to the distributed ledger, and a central entity must manage the distributed ledger. Thus, a centralized distributed ledger may not be acceptable for all applications, such as where it is desirable for the fact that a consensus agreement has been reached to be public knowledge such that it can be verified by third parties.

FIG. 1 is a schematic diagram of the TCC system 100, according to an example embodiment. The TCC system 100 includes a first entity computing system 102, a second entity computing system 104, a TCC computing system 106, a time stamp authority (TSA) computing system 108, and one or more distributed ledger computing systems 110 (e.g., distributed repository). Each of the first entity computing system 102, the second entity computing system 104, the TCC computing system 106, the TSA computing system 108, and the distributed ledger computing systems 110 is in operative communication with the others via a network 112. Generally, the TCC system 100 structured so that legal prose and chain code, agreed upon by a first entity operating the first entity computing system 102 and a second entity operating the second entity computing system 104, remain unchanged and uncompromised over the lifecycle of a smart contract. In some embodiments, the terms of the smart contract are digitally signed by each entity beholden to the smart contract (e.g., first entity and second entity) before it is used to generate a TCC message and published to the distributed ledger. In other embodiments, the TCC message is additionally signed by the TCC computing system before it is published to the distributed ledger. In other embodiments, the entities beholden to the smart contract provide their digital signatures over the terms of the smart contract and are included in the TCC message signed by the TCC computing system.

The first entity computing system 102 includes a network interface 114, a key management circuit 116, and a digital signature circuit 118. The network interface 114 is structured to facilitate operative communication between the second entity computing system 104, the TCC computing system 106, distributed ledger computing systems 110, and other systems and devices over the network 112.

The key management circuit 116 is structured to generate or retrieve a public/private key pair for the digital signature on the terms of the smart contract. As described in greater detail below, the first entity computing system 102 may digitally sign the terms and provide the message to the second entity computing system 104 to be nested and/or signed by the second entity computing system 104 or may provide the digitally sign the terms to the TCC computing system 106. In some embodiments the public/private key pair is associated with a digital certificate in a PKI, for example the X.509 certificate. In those embodiments, a key pair is generated (the private/public key pair must be generated together as they are mathematically related), the private key signs the public key, and the pair is summited to a certificate authority (CA) or the front-end registration authority that will then generate that public key certificate. Alternatively, the private/public key pair could be issued with a commercial CA, for example one associated with a financial institution or using an internally generated self-signed certificate. In other embodiments, the key management circuit 116 generates an ephemeral public/private key pair not associated with a digital certificate in a PKI.

The digital signature circuit 118 is structured to digitally sign the first SignedData message to be used to generate the TCC message and verify the digital signature in a received SignedData message, for example from the second entity computing system 104. The digital signature circuit 118 is structured to verify and sign a message using the SignedData or detached SignedData message schema, each of which provides unique functionality. The digital signature circuit 118 can subsequently verify a digital signature by a third party using a signature verifying algorithm with the message, the public key for the party, which the third party retrieves from the party's digital certificate, and the digital signature. As will be appreciated, signing the message with the digital signature circuit 118 is the equivalent to the first entity agreeing to the terms of the first SignedData message.

The second entity computing system 104 includes a network interface 120, a key management circuit 122, and a digital signature circuit 124. The network interface 120 is structured to facilitate operative communication between the first entity computing system 102, the TCC computing system 106, the distributed ledger computing systems 110, and other systems and devices over the network 112.

The key management circuit 122 is structured to generate or retrieve a public/private key pair for the digital signature on the terms of the smart contract. As described in greater detail below, the second entity computing system 104 may digitally sign the terms and provide the message to the first entity computing system 102 to be nested and/or signed by the first entity computing system 102 or may provide the digitally sign the terms to the TCC computing system 106. In some embodiments the public/private key pair is associated with a digital certificate in a PKI, for example the X.509 certificate. In those embodiments, a key pair is generated (the private/public key pair must be generated together as they are mathematically related), the private key signs the public key, and the pair is summited to a CA or the front-end registration authority that will then generate that public key certificate. Alternatively, the private/public key pair could be issued with a commercial CA, for example one associated with a financial institution or using an internally generated self-signed certificate. In other embodiments, the key management circuit 122 generates an ephemeral public/private key pair not associated with a digital certificate in a PKI.

The digital signature circuit 124 is structured to digitally sign the second SignedData message to be used to generate the TCC message and verify the digital signature in a received first SignedData message, for example from the first entity computing system 102. The digital signature circuit 124 is structured to verify and sign a message using the SignedData or detached SignedData message schema, each of which provides unique functionality. The digital signature circuit 124 can subsequently verify a digital signature by a first party using a signature verifying algorithm with the message, the public key for the party, which the first party retrieves from the party's digital certificate, and the digital signature. As will be appreciated, signing the message with the digital signature circuit 124 is the equivalent to the second entity agreeing to the terms of the first SignedData message.

The TCC computing system 106 includes a network interface 130, a key management circuit 132, a digital signature circuit 134, a memory 136, verification circuit 138, a TCC message circuit 140, and a distributed ledger circuit 142. The network interface 130 is structured to facilitate operative communication between the first entity computing system 102, the TCC computing system 106, the distributed ledger computing systems 110, and other systems and devices over the network 112. In some embodiments, the TCC computing system 106 is configured to identify and assess any alterations of the chain code, from contract negotiation, to agreement, through execution. For example, the TCC computing system 106 may be operably linked to and/or include rules related to a CA subscriber agreement or certificate policy/certificate practice statements (CP/CPS) that defined a process for processing problems of fraud or misconduct by the agreeing parties and/or a third party. In some embodiments, the CP is stored in an attribute of the TCC message.

The memory 136 includes a key database 144 and a distributed ledger database 146. The key database 144 is configured to retrievably store information relating to the TCC computing system's public/private key pair and/or the other entities (first, second, etc.) public/private key pair. For example, the key database 144 may store the public/private keys and digital certificate for the TCC computing system 106 and may store the public key and information for the first entity computing system 102 and second entity computing system 104. The distributed ledger database 146 is configured to retrievably store information relating to the distributed ledger computing systems 110 to which the TCC posts the TCC message once the TCC message has been verified and the terms of the underlying smart contract are agreed upon. For example, the distributed ledger database 146 may store the entirety or part of a distributed ledger downloaded from the one or more distributed ledger computing systems 110. The distributed ledger database 146 may also store the TCC message and/or the smart contract to monitor for the occurrence of terms of the smart contract.

The verification circuit 138 is configured to verify that a consensus has been reached between the first entity computing system 102 and the second entity computing system 104 with regard to the smart contract terms. In some embodiments, the first entity computing system 102 and the second entity computing system 104 each separately send a digitally signed message to the TCC computing system 106 and the verification circuit 138 verifies that the terms in each digitally signed message match. In other embodiments, the first entity computing system 102 or the second entity computing system 104 send a digitally signed message that includes a nested digitally signed message of the other entity to the TCC computing system 106 and the verification circuit 138 verifies that the terms in each digitally signed message (e.g., parent and nested) match. If the verification circuit 138 is able to confirm, for example, that consensus has been reached and the signatures are valid, the verification circuit 138 is configured to allow for the posting of the TCC message to a distributed ledger via the TCC message circuit 140 and/or distributed ledger circuit 142. The verification circuit 138 may be configured to receive a SignedData message. In some embodiments, the verification circuit 138 may further be configured to authenticate the first entity computing system 102 and the second entity computing system 104 based on a second authentication factor, such as by using biometric.

The TCC message circuit 140 is configured to generate a TCC message. The generation of a TCC message is discussed in greater detail below in method 200 of FIG. 2. The TCC message circuit 140 may generate a TCC message that is digitally signed by the TCC computing system 106 and includes the smart contract agreed upon by the first entity and the second entity. In some embodiments, the TCC message circuit 140 may compile and publish the TCC message, without a digital signature by the TCC computing system 106, to the distributed ledger circuit 142. The TCC message circuit 140 may be configured to monitor and approve pending chain code to ensure that it is consistent with the chain code agreed upon in the original TCC message, however, in some embodiments, the distributed ledger circuit 142 may be configured to verify the pending chain code.

In some embodiments, the TCC message circuit 140 facilitates an update (e.g., amendment) to the legal prose and/or chain code of the smart contract agreed upon by the first entity and the second entity. For example, the first entity computing system 102 and the second entity computing system 104 may want to update the terms of the smart contract and submit an amendment message, signed by both parties, to the TCC computing system 106. The TCC computing system 106 retrieves the original TCC message, includes the original TCC message in a signed attribute along with the new terms of the amended TCC message, and posts the amended TCC message to the one or more distribute ledgers computing systems 110.

The distributed ledger circuit 142 is configured to manage the operations of the TCC computing system 106 with respect to the distributed ledger. In some embodiments, the distributed ledger circuit 142 monitors for occurrence of the terms in a smart contract in a TCC message and verify that a pending chain code (e.g., chain code that is triggered by the occurrence of an event) is the same chain code originally agreed upon by the first entity and the second entity. Accordingly, the distributed ledger circuit 142 is configured to communicate with the one or more distributed ledger computing systems 110, for example, while posting a verified SignedData message to the distributed ledger. As an illustration, in some embodiments, the distributed ledger must be downloaded to a local computing system node before operations may be performed on the distributed ledger. Accordingly, the distributed ledger circuit 142 is configured to download the distributed ledger from the one or more distributed ledger computing systems 110 and retrievably store the distributed ledger in the distributed ledger database 172. The distributed ledger circuit 142 is further configured to post the verified SignedData message to the distributed ledger and transmit the modified ledger back to the distributed ledger computing system 110.

Expanding upon the distributed ledger circuit 142 being configured to validate a chain code element within a TCC message. The distributed ledger circuit 142 may monitor for an occurrence of a condition, event, or term outlined in the legal prose in the smart contract of a TCC message. The occurrence triggers the TCC system 100 and/or the TCC computing system 106 to validate the chain code element of the TCC message associated with the upcoming chain code element of a smart contract that is about to be executed. The validation can be conducted by the distributed ledger circuit 142, a relying party computing system, or a third-party computing system (e.g., audit entity). When a digital signature on a chain code manifest is verified to be correct, the path validation concludes that the digital signature is from a trusted source, and the hash of each chain code manifest component is verified against the current hash of the actual information object indicated in the chain code manifest.

The TSA computing system 108 includes a network interface 160 and a time stamp circuit 162. The TSA computing system 108 is managed by any trusted time authority that can provide a trusted time stamp token (TST) for a piece of information or data entry. The trusted time authority can be one that complies with the X9.95 standard, or those defined in similar standards by ISO/IEC, and satisfies legal and regulatory requirements. In some embodiments, the TSA computing system 108 may be contained in, and controlled by, the TSA computing system 108 or any one of the first entity computing system 102, second entity computing system 104, and/or TCC computing system 106. The network interface 140 is structured to facilitate operative communication between the TSA computing system 108 and any one of the first entity computing system 102, second entity computing system 104, and/or TCC computing system 106 over the network 112. The time stamp circuit 162 is structured to negotiate a trusted TST, which includes receiving a hash of a piece of information and generating a trusted TST for the information for future verification.

The one or more distributed ledger computing systems 110 are associated with the distributed ledger to which the TCC computing system 106 posts the TCC message. For example, the one or more distributed ledger computing systems 110 may be or include a central computer network storing the distributed ledger, computer nodes verifying transactions posted to the distributed ledger, computer nodes posting transactions to the distributed ledger, and so on. The distributed ledger computing system 110 is structured to store information, content, smart contracts, etc. that are needed to shared amongst the entities in the TCC system 100. In various embodiments, the distributed ledger may be a permissionless or a permissioned ledger. If permissionless, the one or more distributed ledger computing systems 110 may include any computing system capable of downloading transactions posted to, verifying transactions posted to, and/or posting transactions to the distributed ledger. If permissioned, the one or more computing systems 110 may be associated with one or more trusted entities, including the TCC computing system 106, and given access to the distributed ledger for the purposes of posting transactions and verifying transactions posted to the distributed ledger. Moreover, in some embodiments, the distributed ledger computing system 110 may be a single computing system, for example, trusted to verify and maintain a distributed ledger.

As shown in FIG. 1, the one or more distributed ledger computing systems 110 each include at least a network interface 170 and a distributed ledger database 172. The network interface 170 is structured to facilitate operative communication between the first entity computing system 102, the TCC computing system 106, the TSA computing system 108, and other systems and devices over the network 112. Additionally, the network interface 170 may be configured to monitor and communicate with third party computing systems to monitor the occurrence of conditions in the smart contracts. The distributed ledger database 172 is configured to retrievably store information relating to the distributed ledger, which information may, for example, be downloaded from a central computing system or from the other distributed ledger computing systems 110. It should be understood, however, that in some embodiments, the one or more distributed ledger computing systems may include components in addition to the network interface 170 and the distributed ledger database 172. For example, a given distributed ledger computing system 110 may include an input/output circuit, display, distributed ledger circuit, etc.

In some arrangements, the one or more distributed ledger computing systems 110 and/or the distributed ledger database 146 stores an event entry generated by the TCC computing system 106. The event journal entry can capture a verification process result of a digital signature, the generation of a TCC message, the validation of a pending chain code, or other information. The event journal is attributable to authenticated sources and may be digitally signed (or otherwise protected) to meet these requirements. The date and time in each event journal record definition indicate when the record was created.

Figure 2:
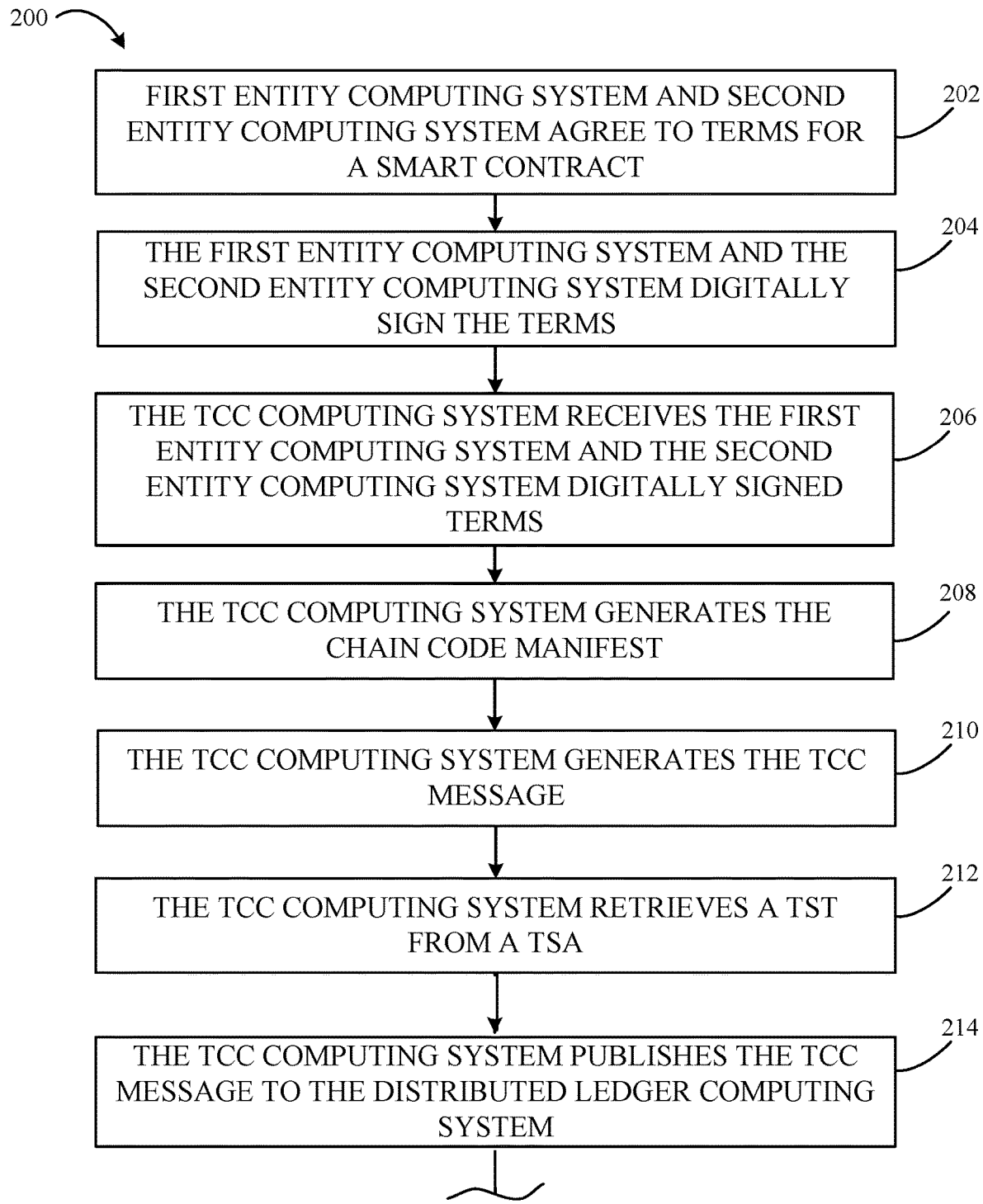
FIG. 2 is a flow diagram of a method of generating a TCC message, according to an example embodiment.

Turning to FIG. 2, a method 200 of generating a TCC message described, according to an example embodiment. Generally, the TCC system 100 and/or the TCC computing system 106 can generate a TCC message and store it on the one or more distributed ledger computing systems 110. The method 200 may include receiving one or more digitally signed messages, verifying the terms of the message, and generating a TCC message. The chain code manifest list entries may also include other information that is bound under the digital signature on the chain code manifest. As will be appreciated, by including a hash-of-hashes of each chain code element in the chain code manifest, in some embodiments, it is possible to determine which code elements had been altered when a digital signature fails, by parsing and examining the list of chain code manifest items and checking the hash of each item. Any items whose hashes did not match that in the signed manifest would be detected.

At step 202, a first entity computing system 102 and a second entity computing system 104 agree to terms for a smart contract. The terms include the plain language outlining the conditions and actions that are triggered by the conditions. The terms also include the chain code that outline the computer language, computer software, and/or other code-based information that are a part of the lifecycle of the smart contract. The agreement process may be an iterative approach between the first entity computing system 102 and a second entity computing system 104 until an agreed upon terms are reached.

At step 204, the first entity computing system 102 and the second entity computing system 104 digitally sign the terms. The first entity computing system 102 and the second entity computing system 104 generate a digitally signed message that includes the terms of the smart contract. In some embodiments, the first entity computing system 102 digitally signs a message that is sent to the second entity computing system 104 that digitally signs a message with the first entity's signed message nested within. In other embodiments, the first entity computing system 102 digitally signs the terms and send them to the TCC computing system 106 and the second entity computing system 104 digitally signs the terms and send them to the TCC computing system 106.

At step 206, the TCC computing system 106 receives the first entity computing system 102 and the second entity computing system 104 digitally signed terms. The TCC computing system 106 may review the terms signed by each entity to ensure that they match.

At step 208, the TCC computing system 106 generates the chain code manifest. The chain code manifest includes a hash of the chain code of the smart contract. In some embodiments, each chain code element of the smart contract is hashed. In some embodiments, the chain code manifest itself is hashed (e.g., a hash of a collection of hashes or as a hash of the entire chain code unhashed) to provide data integrity and assurance that no chain code has been removed or added to the chain code manifest at a later time. In some embodiments, the chain code manifest is defined as a value of type ChainCodeManifest that includes a list of one or more chain code elements. In some embodiments, each element in the list of chain code elements includes: an element descriptor or name; a pointer or URI to the chain code element; and a value of CMS type DigestInfo. The element descriptor may be in the form of a fully-qualified file name. The pointer or URI may include access parameters associated with it. The type DigestInfo may include a hash algorithm and any associated parameters along with a cryptographic hash of the chain code element. In some embodiments, the chain code element in the manifest may include a pointer to the associated portion of the legal prose within the TCC message.

In some embodiments, the Type ChainCodeManifest is defined as:
  ChainCodeManifest::=SEQUENCE (1 . . . MAX) OF
    ChainCodeElement

```
ChainCodeElement::=SEQUENCE {
   version Version,
   descriptor Descriptor,
   location Location,
   hash DigestInfo
   }
Version::=INTEGER v0(0) (0 . . . MAX)
Descriptor::=UTF8String (SI4E(1 . . . MAX))
Location::=CHOICE {
   uri UTF8String (SI4E(1 . . . MAX)),
   pointer OCTET STRING
   }
```

At step 210, the TCC computing system 106 retrieves a TST from a TSA. A TST may be generated from a hash of a value of the chain code, the chain code manifest (e.g., type ChainCodeManifest), and/or one or more elements of the chain code manifest. As will be appreciated, the TST may be used by an entity within the TCC system or a third party to gain assurance in the chain code executed in the smart contract. A TCC message may include a TST with a digitally signed chain code manifest. In other embodiments, the TCC message may include a signed attribute that is cryptographically bound to the manifest under a digital signature in a SignedDataCC message. A provider of the TCC system and/or a entity a part of the TCC system may digitally sign a TST and a value of type ChainCodeManifest, which may include additional attributes of a wide variety of type or format. The SignedDataCC message type may be defined as:

```
SignedDataCC::=SignedData (CONSTRAINED BY {
   ChainCodeManifest,
   TST
   }
```

In some embodiments, the TST from the chain code manifest is a value of type DigestInfo. The type DigestInfo may be defined in the X9.73 Cryptographic Message Syntax (CMS) standard as:

```
DigestInfo::=SEQUENCE {
   hashAlgorithm DigestAlgorithmIdentifier,
   digest Digest
   }
Digest::=OCTET STRING
```

At step 212, the TCC computing system 106 generates the TCC message. In some embodiments, the TCC message includes the terms as content and the digitally signed messages from the first and second entity in a signed attribute of the TCC message. The digital signature is done through a key pair of the TCC computing system 106. In other embodiments, the TCC message includes the terms as content and a digital signature over the chain code manifest. In other embodiments, the TCC message includes the terms as content and a digital signature over a hash of the legal prose and the chain code manifest, with the digitally signed messages from the first and second entity bound under the digital signature or stored in an unsigned attribute or detached attribute of the TCC message.

In some embodiments, the TCC message is a SignedData message that includes the chain code manifest as a signed attribute or as message content. In embodiments where the chain code manifest is included as message content, a hash of the entire chain code manifest will be generated and provide data integrity and assurance that no chain code has been removed or added to the chain code manifest at a later time. In embodiments where the chain code manifest is a signed attribute, the chain code manifest may be authenticated by comparing the chain code to the associated portion of the legal prose included in the content of the SignedData message. As will be appreciated, the legal prose will be hashed and bound under the digital signature as a result of being included within the content. In some embodiments, the chain code manifest includes a Boolean criticality flag on an element of the chain code manifest. The Boolean criticality flag would indicate whether an item/element of the chain code manifest could be patched or altered. Beneficially, this would allow chain code and/or TCC message to be non-substantively changed (e.g., a chain code element marked non-critical is changed) and still provide a working TCC message. For example, a non-critical chain code element is changed, thereby causing a signature check to fail. However, the TCC computing system 106 may review all critical chain code elements and, identifying that no critical chain code elements were compromised, determine that the TCC message and chain code in the smart contract is "valid" and allow execution of the chain code.

At step 214, the TCC computing system 106 publishes the TCC message to the distributed ledger computing system 110. In some embodiments, the method 200 may be used to amend an existing TCC message and smart contract. For example, the first entity and the second entity may agree to amend a portion of the smart contract. The new terms could include a nested version of the old terms. This would allow nested SignedData messages to be treated as a valid smart contract modification so long as the hash of the innermost SignedData message matched the hash in the manifest and it was wrapped in a SignedData message In some embodiments, the TCC message may be generated by having a first party initiate the process by signing a SignedData message using SignerInfo(0) and sending it to a second party. The second party creates a signerInfo attribute that contains as payload the SignerInfo(0) value. The second party signs the payload along with the messageDigest and contentType attributes using SignerInfo(1). The second party sends the signed message along to TCC computing system 106 that creates a signerInfo attribute containing as its payload the SignerInfo(1) value. The TCC computing system 106 signs the payload along with the messageDigest and contentType attributes using SignerInfo(2).

Turning to FIG. 3A, a schematic diagram of a generated TCC message 300 is shown, according to an example embodiment. The TCC message 300 may be generated using the method 200 described in FIG. 2. The TCC computing system 106 generates the TCC message 300 using a SignedData message with the legal prose and/or the chain code stored as the content component. In some embodiments, the TCC message 300 may include a digitally signed message (SD1) that includes, as content, the legal prose and chain code from the first entity and a digitally signed message (SD2) that includes, as content, the legal prose and chain code from the second entity. In those embodiments, each digitally signed message may be included in the content, in a signed attribute, and/or an unsigned attribute of the TCC message 300. A hash of the content and the chain code manifest (or a hash of the chain code) are stored in a signed attribute of the TCC message 300. Using the indirect signature method, the TCC computing system signs the message to generate the TCC message 300. In some embodiments, the TCC message 300 may contain legal prose in a descriptive text component. The TCC system and/or TCC computing system 106 posts the TCC message onto the distributed ledger computing system(s) 110 or similar repository. As will be appreciated, the first entity computing system 102 or second entity computing system 104 can later provide the original Terms to a third party who can determine whether the pending code or already executed code is valid using the TCC message 300 or the information posted to the distributed ledger.

Turning to FIG. 3B, a schematic diagram of a generated TCC message 320 is shown, according to an example embodiment. A difference between the TCC message 320 and the TCC message 300 is that the TCC message 320 is a nested TCC message that includes a first message digitally signed by a first entity nested within a second message digitally signed by the second entity. A first entity computing system 102 creates a first SignedData message with a content of the legal prose and, in some cases, chain code, as the "Terms" of the smart contract. A hash of the content and the chain code manifest (or a hash of the chain code) are stored in a signed attribute of the first SignedData message. In some embodiments, the chain code may be included in the content and a hash of the chain code included in the signature. The first entity computing system 102 uses a private key of a private-public key pair to sign the signed attributes, including the chain code manifest and a hash of the legal prose. A TST may be included in the signed attributes and/or in the first SignedData message. The first SignedData message S(SD1) may be defined as:

S(SD1)=SignedData {LegalProse, Signed(Hash(Terms), Chain Code Manifest), TST}

The first entity computing system 102 sends the first SignedData message to a second entity computing system 104. The second entity computing system 104 reviews and agrees to the terms of smart contract (the legal prose and chain code). The second entity computing system 104 may remove the "Terms" from the first SignedData message to create a derivative second SignedData message, S(SD2). As will be appreciated, removing the "Terms" from S(SD1) does not impact the validity of the first computing system's digital signature, because the first entity computing system 102 signed the hash of the Terms rather than the document itself. In some embodiments, the chain code manifest is not included in the S(SD1) message as the chain code manifest is included in the hash of S(SD1). The second SignedData message is generated similar to S(SD1) message. The second SignedData message S(SD2) may be defined as:

S(SD2)=SignedData {Signed(Hash(SD1), Chain Code Manifest), TST)}

The second entity computing system 104 may send the second SignedData message back to the first entity computing system 102 to compare like elements of the first SignedData message and the second SignedData message. The first entity computing system 102 may validate signatures and perform other checks to ensure consensus has been reached (e.g., that the terms of the first SignedData message match the second SignedData message). If consensus has been reached and the signatures are valid, the second SignedData message is sent to the TCC computing system 106.

The TCC computing system 106 receives the second SignedData message from either the first entity computing system 102 or the second entity computing system 104. In some embodiments, the TCC message 320 is generated by one of the first entity computing system 102 or the second entity computing system 104. In some embodiments, the TCC computing system 106 may compare like elements of the first SignedData message and the second SignedData message, validate signatures, and perform other checks to ensure consensus has been reached. The TCC message 320 is generated by the TCC computing system 106 by generating a message that includes as content the second SignedData message and the hash of the SD2 message in a signed attributes that is digitally signed by the TCC computing system 106. The TCC message 320 may be defined as:

S(TCC Message)=SignedData {S(SD2), Signed(Hash(S (SD2)), TST}

In some embodiments, the TCC message 320 is not signed by the TCC computing system 106 before it is published to the distributed ledger computing systems 110. As will be appreciated, the first entity computing system 102 or second entity computing system 104 can later provide the original Terms to a third party who can determine whether the pending code or already executed code is valid using the TCC message 320 or the information posted to the distributed ledger.

Turning to FIG. 3C, a schematic diagram of a generated TCC message 340 is shown, according to an example embodiment. A difference between the TCC message 340 and the TCC message 300 is that the TCC message 340 is a includes a first message digitally signed by a first entity and a second message digitally signed by the second entity. A first entity computing system 102 creates a first SignedData message with a content of the legal prose and, in some cases, chain code, as the "Terms" of the smart contract. A hash of the content and the chain code manifest (or a hash of the chain code) are stored in a signed attribute of the first SignedData message. In some embodiments, the chain code may be included in the content and a hash of the chain code included in the signature. The first entity computing system 102 uses a private key of a private-public key pair to sign the signed attributes, including the chain code manifest and a hash of the legal prose. A TST may be included in the signed attributes and/or in the first SignedData message. The first SignedData message S(SD1) may be defined as:

S(SD1)=SignedData {LegalProse, Signed(Hash(Terms), Chain Code Manifest), TST}

A second entity computing system 104 creates a second SignedData message with a content of the legal prose and, in some cases, chain code, as the "Terms" of the smart contract. A hash of the content and the chain code manifest (or a hash of the chain code) are stored in a signed attribute of the second SignedData message. In some embodiments, the chain code may be included in the content and a hash of the chain code included in the signature. The second entity computing system 104 uses a private key of a private-public key pair to sign the signed attributes, including the chain code manifest and a hash of the legal prose. A TST may be included in the signed attributes and/or in the second SignedData message. The second SignedData message S(SD2) may be defined as:

S(SD2)=SignedData {LegalProse, Signed(Hash(Terms), Chain Code Manifest), TST}

The TCC computing system 106 receives the first SignedData message from the first entity computing system 102 and the second SignedData message from the second entity computing system 104. In some embodiments, the TCC computing system 106 may compare like elements of the first SignedData message and the second SignedData message, validate signatures, and perform other checks to ensure consensus has been reached. The TCC message 320 is generated by the TCC computing system 106 by generating a message that includes as content the first SignedData message, the second SignedData message and a hash of the first SignedData message and a hash of the second SignedData message in a signed attributes that is digitally signed by the TCC computing system 106. In some embodiments, a hash of the terms is included in the signed attributes in place of the hash of the first SignedData message and the hash of the second SignedData message. The TCC message 340 may be defined as:

S(TCC)=SignedData {(SD1), (SD2), Signed(Hash(S (SD1), Hash(S(SD2)), TST)}

As will be appreciated, the first entity computing system 102 or second entity computing system 104 can later provide the original Terms to a third party who can determine whether the pending code or already executed code is valid using the TCC message 340 or the information posted to the distributed ledger.

Figure 4:
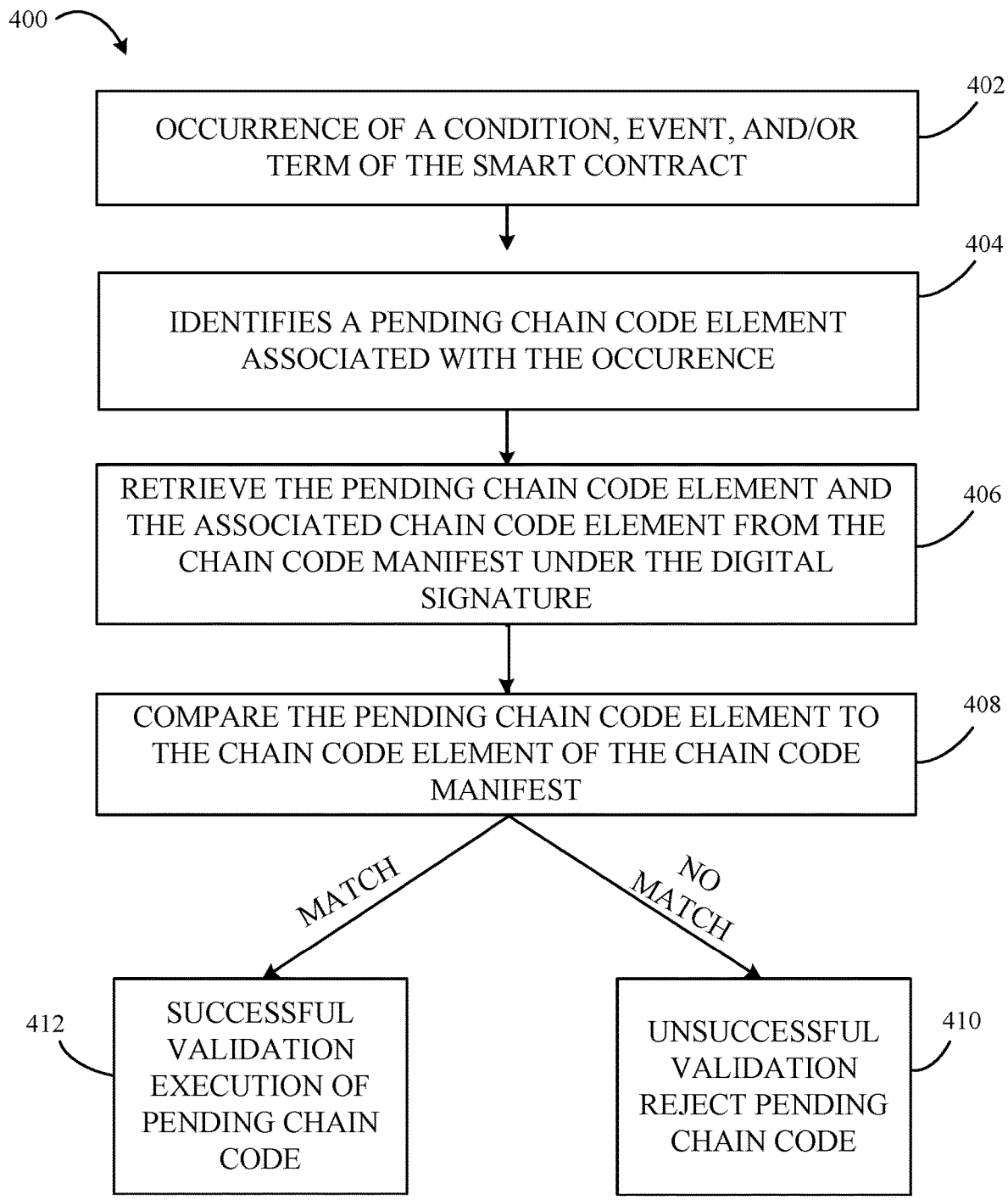
FIG. 4 is a flow diagram of a method of verifying a pending chain code with the TCC message, according to an example embodiment.

Turning to FIG. 4, a method 400 of validating a pending chain code element is described, according to an example embodiment. The method 400 may be implemented by the TCC system 100 and/or the TCC computing system 106 of FIG. 1. The method 400 include verifying the signature on the bound components (e.g., chain code manifest) of the TCC message prior to execution of a portion of the smart contract (e.g., chain code) to ensure that the pending chain code is the same as the chain code originally agreed upon. The method 400 may include locating each component of the chain code and verifying that the hash of the pending chain code hash matches the hash of that component listed in the digitally signed chained code manifest. The chain code manifest list entries may also include other information that is bound under the digital signature on the chain code manifest.

At step 402, a condition, event, or term outlined in the legal prose in the smart contract of a TCC message occurs.

At step 404, a TCC computing system 106 identifies a pending chain code element (e.g., a first chain code element) that corresponds with the occurrence of the condition, event, or term outlined in the legal prose in the TCC message. The TCC system may monitor for the occurrence constantly or on a periodic basis (e.g., hourly, daily, monthly, etc.). In some embodiments, the chain code element may be stored within a TCC message that includes a chain code manifest under a digital signature. In other embodiments, the pending chain code is external to the smart contract.

At step 406, the TCC computing system 106 retrieves the pending chain code element (e.g., queued up for execution) and the associated chain code element from the chain code manifest under the digital signature. The chain code manifest may be structured such that each chain code element includes a name associated with the pending chain code and/or a pointer to the pending chain code to aid the TCC computing system in identifying the associated chain code elements. In some embodiments, the TCC computing system may retrieve the chain code elements in the smart contract (including the pending chain code) and the entire chain code manifest, to compare both. In other embodiments, the chain code manifest may include file properties such as file date and size. The location of the file may be included, perhaps in the form of a URI or LDAP or DAP Directory entry.

At step 408, the TCC computing system compares the pending chain code element to the chain code element of the chain code manifest. This may include generating a hash of the pending chain code element and comparing it to the hash stored in the TCC message that is associated with the pending chain code. In some embodiments, some or all of the chain code element in the smart contract (including the pending chain code) is compared to each associated chain code element in the chain code element manifest. In some embodiments, the TCC computing system can generate a hash of the pending chain code using the same DigestInfo hash algorithm and parameters to compute a message digest. The TCC computing system can compare the message digest to the one in the chain code manifest. If the hash of the pending chain code element does not match the hash of the chain code element in the chain code manifest, the TCC computing system prevents the pending chain code from executing at step 412.

If the hash of the pending chain code element does match the hash of the chain code element in the chain code manifest, the TCC computing system proceeds to step 410. At step 410, the TCC computing system allows the pending chain code element to execute. In some embodiments, the TCC computing system may validate the TST of the chain code manifest. In some embodiments, the TCC computing system may verify the path of the digital signature or digital signatures over the chain code manifest. In some embodiments, an event journal entry may be generated that includes the validation result (either a successful validation at step 410 or an unsuccessful validation at step 412) and a TST. If after a successful digital signature verification and path validation it turns out that one or more objects have been modified, it will be possible to detect these and to still have assurance that none of the other smart contract components have been compromised. As will be appreciated, this is a benefit of the signed manifest being a signed hash of the manifest component hashes.

Furthermore, because the SignedData message syntax supports multiple signers, per-signer authenticated attributes, unsigned attributes, and countersignatures, more elaborate scenarios than the above examples of method 200 and method 400 may be supported. Additionally, as an alternative to the above scenarios, it is possible for the parties to send SignedData messages to each other that contain the content of interest but to remove the content before posting the message(s) on a ledger to preserve the confidentiality of the content. If so, transaction details described in the content could be placed on, for example, a public journal with loss of confidentiality limited to the transacting parties. It is also possible to use distinct SignedData messages to conduct the example flows above, instead of the nested messages described. If these messages included a transaction set indicator, then a set of such messages posted to a blockchain could be collected for audit and other purposes. If each message was a distinct block on the ledger, then a program for identifying messages posted to a distributed ledger could be used to collect this information.

It should further be understood that method 200 and method 400 are intended to be exemplary and that other embodiments of processes for demonstrating consensus agreement using cryptographic containers may be used. For example, in both method 200 and method 400, the TCC is included in the signed attributes of the messages. The TCC message may be stored in a database accessible to a Trusted Party, and a Trusted Party retrieves the TCC message based on the identifier (e.g., by matching the identifier to the rule identifier in the TCC). After the Trusted Party posts the message to the distributed ledger, the first and second entities may initiate the smart contract such that the terms of the smart contract are self-executing and, for example, automatically cause a transfer of value in response to the occurrence of an event or the fulfillment of a condition.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include machine or non-transitory computer-readable media that are executable by one or more processors (e.g., multiple remote processors connected to each other through any type of network). The non-transitory machine-readable media may include code, which may be written in any programming language, including, but not limited to, Java or the like and any conventional procedural programming languages, such as the "C" programming language or similar programming languages. Alternatively, the term "circuit" may include hardware structured to execute the functions described herein, and in some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits ("IC"), discrete circuits, system on a chip ("SOC") circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, or XNOR), resistors, multiplexers, registers, capacitors, inductors, diodes, wiring, and so on. Thus, a circuit may also include programmable hardware devices such as field programmable gate arrays, programmable array logic programmable logic devices, or the like.

In other embodiments, the "circuit" includes one or more processors communicably coupled to one or more memories or memory devices. In this regard, the one or more processors execute instructions stored in the memory or execute instructions otherwise accessible to the one or more processors. In various arrangements, the one or more processors are embodied in various ways and are constructed in a manner sufficient to perform at least the operations described herein. In some embodiments, the one or more processors are shared by multiple circuits (e.g., circuit A and circuit B comprise or otherwise share the same processor which, in some example embodiments, executes instructions stored, or otherwise accessed, via different areas of memory). Additionally, in various arrangements, a given circuit or components thereof (e.g., the one or more processors) are disposed locally (e.g., as part of a local server or a local computing system) or remotely (e.g., as part of a remote server such as a cloud based server). To that end, in certain arrangements, a "circuit" as described herein includes components that are distributed across one or more locations.

As used herein, a processor is implemented as a general-purpose processor, an application specific integrated circuit ("ASIC"), one or more field programmable gate arrays ("FPGA"s), a digital signal processor ("DSP"), a group of processing components, or other suitable electronic processing components. Additionally, in some arrangements, a "processor," as used herein, is implemented as one or more processors. In certain embodiments, the one or more processors are structured to perform or otherwise execute certain operations independent of one or more co-processors. In other example embodiments, two or more processors are coupled via a bus to enable independent, parallel, pipelined, or multi-threaded instruction execution. In some arrangements, the one or more processors take the form of a single core processor, multi-core processor (e.g., a dual core processor, triple core processor, or quad core processor), microprocessor, and the like. In some embodiments, the one or more processors are external to the apparatus, for example, the one or more processors are a remote processor (e.g., a cloud based processor). Alternatively, or additionally, the one or more processors are internal and/or local to the apparatus. Accordingly, an exemplary system for implementing the overall system or portions of the embodiments might include a general purpose computing computers in the form of computers, including a processing unit, a system memory, and a system bus that couples various system components including the system memory to the processing unit.

Additionally, as used herein, a memory includes one or more memory devices including non-transient volatile storage media, non-volatile storage media, non-transitory storage media (e.g., one or more volatile and/or non-volatile memories), and the like. In some embodiments, the non-volatile media takes the form of ROM, flash memory (e.g., flash memory such as NAND, 3D NAND, NOR, or 3D NOR), EEPROM, MRAM, magnetic storage, hard discs, optical discs, and the like. In some embodiments, the volatile storage media takes the form of RAM, TRAM, ZRAM, and the like. Combinations of the above are also included within the scope of machine-readable media. In this regard, machine-executable instructions comprise, for example, instructions and data which cause a general purpose computer, special purpose computer, or special purpose processing machines to perform a certain function or group of functions. In various arrangements, each respective memory device is operable to maintain or otherwise store information relating to the operations performed by one or more associated circuits, including processor instructions and related data (e.g., database components, object code components, or script components), in accordance with the example embodiments described herein.

It should be understood that a "network interface," as used herein, is structured to communicate data over a network (e.g., the network 112). In some arrangements, a network interface includes hardware and machine-readable media sufficient to support communication over multiple channels of data communication. Further, in some arrangements, the network interface includes cryptography capabilities to establish a secure or relatively secure communication session between the device including the network interface and other devices of the system 100 via the network 112. In this regard, personal information about clients, financial data, and other types of data is encrypted and transmitted to prevent or substantially prevent the threat of hacking.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques, with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A method of generating a trusted chain code ("TCC") message, comprising:
   receiving, by a computing system, an agreement message between a first entity and a second entity, the agreement message formatted as a smart contract whose execution causes a transfer of value in response to at least one of an occurrence of an event or a fulfillment of a condition, the smart contract comprising chain code that corresponds to computer language to execute and corresponds to at least one of the occurrence of the event or the fulfillment of the condition,
   wherein the agreement message is digitally signed by a first entity private key of the first entity and a second entity private key of the second entity;
   generating, by the computing system, a chain code manifest, the chain code manifest comprising a hash of the chain code of the smart contract;
   digitally signing, by the computing system, the TCC message comprising at least the smart contract and the chain code manifest, the digital signature on at least the chain code manifest; and
   posting, by the computing system, the TCC message to a distributed ledger,
   wherein an execution of a portion of the chain code in response to at least one of the occurrence of the event or the fulfillment of the condition is validated against corresponding chain code in the chain code manifest, wherein validating the execution of the portion of the chain code comprises:
   retrieving, by the computing system, a first entity public key, the first entity public key of a public/private key pair that includes the first entity private key;
   verifying, by the computing system, that the first entity public key is associated with the first entity;
   retrieving, by the computing system, a second entity public key, the second entity public key of a public/private key pair that includes the second entity private key; and
   verifying, by the computing system, that the second entity public key is associated with the second entity;
   generating, by the computing system, a hash of the portion of the chain code; and
   comparing, by the computing system, the hash of the portion of the chain code to the corresponding portion of the chain code manifest,
   wherein the execution of the portion of the chain code is stopped if the hash of the portion of the chain code does not valid compared to the corresponding portion of the chain code manifest.

2. The method of claim 1, wherein the agreement message is a digitally signed first message by the first entity, the first message comprising a second message digitally signed by the second entity.

3. The method of claim 1, wherein receiving the agreement message comprises receiving a first SignedData message and a second SignedData message, the first SignedData message comprising at least first content and a first digital signature of the first entity on at least a hash of the first content and a first chain code, wherein the first content includes terms of an agreement between the first party and the second party, the second SignedData message comprising at least second content and a second digital signature of the second entity on at least a hash of the second content and a second chain code, wherein the second content includes terms of the agreement between the first party and the second party.

4. The method of claim 3, wherein generating the TCC message further comprising comparing the first content and the second content and the first chain code with the second chain code, wherein a difference in the first content and the second content or the first chain code with the second chain code will prevent the generation of the TCC message.

5. The method of claim 3, wherein the first digital signature is generated using a first entity private key, wherein the second digital signature is generated using a second entity private key, and wherein validating the execution of the portion of the chain code comprises:
   retrieving, by the computing system, a first entity public key, the first entity public key of a public/private key pair that includes the first entity private key;
   verifying, by the computing system, that the first entity public key is associated with the first entity and signed the first SignedData message;
   retrieving, by the computing system, a second entity public key, the second entity public key of a public/private key pair that includes the second entity private key; and
   verifying, by the computing system, that the second entity public key is associated with the second entity and signed the second SignedData message;
   generating, by the computing system, a hash of the portion of the chain code; and comparing, by the computing system, the hash of the portion of the chain code to the corresponding portion of the chain code manifest.

6. The method of claim 1, generating the TCC message further comprises:
time stamping, by the computing system, the chain code manifest using a trusted timing authority to generate a time stamp token, wherein the time stamp token associated with the chain code manifest provides reliability and verifiability of when the chain code manifest was generated.

7. The method of claim 1, wherein generating the TCC message further comprises:
digitally signing, by the computing system, the smart contract using SignedData cryptographic message syntax to generate the TCC message; and
binding, by the computing system, the chain code manifest to the TCC message via an attribute of the TCC message.

8. The method of claim 1, further comprising generating, by the computing system, an event journal entry that comprises a hash of the TCC message and a time stamp token from a trusted timing authority.

9. The method of claim 1, wherein the chain code manifest comprises a plurality of hashes, each hash in the plurality of hashes corresponding to a hash of a chain code associated with a response to the at least one of the occurrence of the event or the fulfillment of the condition.

10. A system comprising:
a processor; and
a non-transitory machine readable medium with instructions stored thereon that, when executed by the processor, cause the system to:
receive an agreement message between a first entity and a second entity, the agreement message formatted as a smart contract whose execution causes a transfer of value in response to at least one of an occurrence of an event or a fulfillment of a condition, the smart contract comprising chain code that corresponds to computer language to execute and corresponds to at least one of the occurrence of the event or the fulfillment of the condition,
wherein the agreement message is digitally signed by a first entity private key of the first entity and a second entity private key of the second entity;
generate a chain code manifest, the chain code manifest comprising a hash of the chain code of the smart contract;
digitally sign a trusted chain code ("TCC") message, the TCC message comprising at least the smart contract, the digital signature on at least the chain code manifest; and
post the TCC message to a distributed ledger,
wherein an execution of a portion of the chain code in response to at least one of the occurrence of the event or the fulfillment of the condition is validated against corresponding chain code in the chain code manifest,
wherein validating the execution of the portion of the chain code comprises:
retrieving, by the computing system, a first entity public key, the first entity public key of a public/private key pair that includes the first entity private key;
verifying, by the computing system, that the first entity public key is associated with the first entity;
retrieving, by the computing system, a second entity public key, the second entity public key of a public/private key pair that includes the second entity private key; and
verifying, by the computing system, that the second entity public key is associated with the second entity;
generating, by the computing system, a hash of the portion of the chain code; and
comparing, by the computing system, the hash of the portion of the chain code to the corresponding portion of the chain code manifest, and
wherein the execution of the portion of the chain code is stopped if the hash of the portion of the chain code does not valid compared to the corresponding portion of the chain code manifest.

11. The system of claim 10, wherein the agreement message is a digitally signed first message by the first entity, the first message comprising a second message digitally signed by the second entity.

12. The system of claim 10, wherein receiving the agreement message comprises receiving a first SignedData message and a second SignedData message, the first SignedData message comprising at least first content and a first digital signature of the first entity on at least a hash of the first content and a first chain code, wherein the first content includes terms of an agreement between the first party and the second party, the second SignedData message comprising at least second content and a second digital signature of the second entity on at least a hash of the second content and a second chain code, wherein the second content includes terms of the agreement between the first party and the second party.

13. The system of claim 12, wherein generating the TCC message further comprising comparing the first content and the second content and the first chain code with the second chain code, wherein a difference in the first content and the second content or the first chain code with the second chain code will prevent the generation of the TCC message.

14. The system of claim 12, wherein the first digital signature is generated using a first entity private key, wherein the second digital signature is generated using a second entity private key, and wherein validating the execution of the portion of the chain code comprises:
retrieving, by the computing system, a first entity public key, the first entity public key of a public/private key pair that includes the first entity private key;
verifying, by the computing system, that the first entity public key is associated with the first entity and signed the first SignedData message;
retrieving, by the computing system, a second entity public key, the second entity public key of a public/private key pair that includes the second entity private key; and
verifying, by the computing system, that the second entity public key is associated with the second entity and signed the second SignedData message;
generating, by the computing system, a hash of the portion of the chain code; and
comparing, by the computing system, the hash of the portion of the chain code to the corresponding portion of the chain code manifest.

15. The system of claim 10, generating the TCC message further comprises:
time stamping, by the computing system, the chain code manifest using a trusted timing authority to generate a time stamp token, wherein the time stamp token associated with the chain code manifest provides reliability and verifiability of when the chain code manifest was generated.

16. The system of claim 10, wherein generating the TCC message further comprises:
 digitally signing, by the computing system, the smart contract using SignedData cryptographic message syntax to generate the TCC message; and
 binding, by the computing system, the chain code manifest to the TCC message via an attribute of the TCC message.

17. A method of generating a trusted chain code ("TCC") message, comprising:
 receiving, by a computing system, an agreement message between a first entity and a second entity, the agreement message formatted as a smart contract whose execution causes a transfer of value in response to at least one of an occurrence of an event or a fulfillment of a condition, the smart contract comprising chain code that corresponds to computer language to execute and corresponds to at least one of the occurrence of the event or the fulfillment of the condition,
  wherein receiving the agreement message comprises receiving a first SignedData message and a second SignedData message, the first SignedData message comprising at least first content and a first digital signature of the first entity on at least a hash of the first content and a first chain code,
  wherein the first content includes terms of an agreement between the first party and the second party, the second SignedData message comprising at least second content and a second digital signature of the second entity on at least a hash of the second content and a second chain code, and
  wherein the second content includes terms of the agreement between the first party and the second party;
 generating, by the computing system, a chain code manifest, the chain code manifest comprising a hash of the chain code of the smart contract;
 digitally signing, by the computing system, the TCC message comprising at least the smart contract and the chain code manifest, the digital signature on at least the chain code manifest;
 comparing the first content and the second content and the first chain code with the second chain code, wherein a difference in the first content and the second content or the first chain code with the second chain code will prevent the generation of the TCC message; and
 posting, by the computing system, the TCC message to a distributed ledger,
  wherein an execution of a portion of the chain code in response to at least one of the occurrence of the event or the fulfillment of the condition is validated against corresponding chain code in the chain code manifest.

18. The method of claim 17, wherein the agreement message is digitally signed by a first entity private key of the first entity and a second entity private key of the second entity.

19. The method of claim 18, wherein validating the execution of the portion of the chain code comprises:
 retrieving, by the computing system, a first entity public key, the first entity public key of a public/private key pair that includes the first entity private key;
 verifying, by the computing system, that the first entity public key is associated with the first entity;
 retrieving, by the computing system, a second entity public key, the second entity public key of a public/private key pair that includes the second entity private key; and
 verifying, by the computing system, that the second entity public key is associated with the second entity;
 generating, by the computing system, a hash of the portion of the chain code; and
 comparing, by the computing system, the hash of the portion of the chain code to the corresponding portion of the chain code manifest,
 wherein the execution of the portion of the chain code is stopped if the hash of the portion of the chain code does not valid compared to the corresponding portion of the chain code manifest.

20. The method of claim 17, wherein the agreement message is a digitally signed first message by the first entity, the first message comprising a second message digitally signed by the second entity.

21. The method of claim 17, wherein the first digital signature is generated using a first entity private key, wherein the second digital signature is generated using a second entity private key, and wherein validating the execution of the portion of the chain code comprises:
 retrieving, by the computing system, a first entity public key, the first entity public key of a public/private key pair that includes the first entity private key;
 verifying, by the computing system, that the first entity public key is associated with the first entity and signed the first SignedData message;
 retrieving, by the computing system, a second entity public key, the second entity public key of a public/private key pair that includes the second entity private key; and
 verifying, by the computing system, that the second entity public key is associated with the second entity and signed the second SignedData message;
 generating, by the computing system, a hash of the portion of the chain code; and
 comparing, by the computing system, the hash of the portion of the chain code to the corresponding portion of the chain code manifest.

22. The method of claim 17, generating the TCC message further comprises:
 time stamping, by the computing system, the chain code manifest using a trusted timing authority to generate a time stamp token, wherein the time stamp token associated with the chain code manifest provides reliability and verifiability of when the chain code manifest was generated.

23. The method of claim 17, wherein generating the TCC message further comprises:
 digitally signing, by the computing system, the smart contract using SignedData cryptographic message syntax to generate the TCC message; and
 binding, by the computing system, the chain code manifest to the TCC message via an attribute of the TCC message.

24. The method of claim 17, further comprising generating, by the computing system, an event journal entry that comprises a hash of the TCC message and a time stamp token from a trusted timing authority.

25. The method of claim 17, wherein the chain code manifest comprises a plurality of hashes, each hash in the plurality of hashes corresponding to a hash of a chain code associated with a response to the at least one of the occurrence of the event or the fulfillment of the condition.

26. A system comprising:

a processor; and a non-transitory machine readable medium with instructions stored thereon that, when executed by the processor, cause the system to:

receive an agreement message between a first entity and a second entity, the agreement message formatted as a smart contract whose execution causes a transfer of value in response to at least one of an occurrence of an event or a fulfillment of a condition, the smart contract comprising chain code that corresponds to computer language to execute and corresponds to at least one of the occurrence of the event or the fulfillment of the condition, wherein receiving the agreement message comprises receiving a first SignedData message and a second SignedData message, the first SignedData message comprising at least first content and a first digital signature of the first entity on at least a hash of the first content and a first chain code, wherein the first content includes terms of an agreement between the first party and the second party, the second SignedData message comprising at least second content and a second digital signature of the second entity on at least a hash of the second content and a second chain code, and wherein the second content includes terms of the agreement between the first party and the second party;

generate a chain code manifest, the chain code manifest comprising a hash of the chain code of the smart contract;

digitally sign a trusted chain code ("TCC") message, the TCC message comprising at least the smart contract, the digital signature on at least the chain code manifest;

compare the first content and the second content and the first chain code with the second chain code, wherein a difference in the first content and the second content or the first chain code with the second chain code will prevent the generation of the TCC message; and post the TCC message to a distributed ledger, wherein an execution of a portion of the chain code in response to at least one of the occurrence of the event or the fulfillment of the condition is validated against corresponding chain code in the chain code manifest.

27. The system of claim 26, wherein the agreement message is digitally signed by a first entity private key of the first entity and a second entity private key of the second entity.

28. The system of claim 27, wherein validating the execution of the portion of the chain code comprises:

retrieving, by the computing system, a first entity public key, the first entity public key of a public/private key pair that includes the first entity private key;

verifying, by the computing system, that the first entity public key is associated with the first entity;

retrieving, by the computing system, a second entity public key, the second entity public key of a public/private key pair that includes the second entity private key; and verifying, by the computing system, that the second entity public key is associated with the second entity;

generating, by the computing system, a hash of the portion of the chain code; and comparing, by the computing system, the hash of the portion of the chain code to the corresponding portion of the chain code manifest, wherein the execution of the portion of the chain code is stopped if the hash of the portion of the chain code does not valid compared to the corresponding portion of the chain code manifest.

29. The system of claim 26, wherein the agreement message is a digitally signed first message by the first entity, the first message comprising a second message digitally signed by the second entity.

30. The system of claim 26, wherein the first digital signature is generated using a first entity private key, wherein the second digital signature is generated using a second entity private key, and wherein validating the execution of the portion of the chain code comprises:

retrieving, by the computing system, a first entity public key, the first entity public key of a public/private key pair that includes the first entity private key;

verifying, by the computing system, that the first entity public key is associated with the first entity and signed the first SignedData message;

retrieving, by the computing system, a second entity public key, the second entity public key of a public/private key pair that includes the second entity private key; and verifying, by the computing system, that the second entity public key is associated with the second entity and signed the second SignedData message;

generating, by the computing system, a hash of the portion of the chain code; and comparing, by the computing system, the hash of the portion of the chain code to the corresponding portion of the chain code manifest.

31. The system of claim 26, generating the TCC message further comprises:

time stamping, by the computing system, the chain code manifest using a trusted timing authority to generate a time stamp token, wherein the time stamp token associated with the chain code manifest provides reliability and verifiability of when the chain code manifest was generated.

32. The system of claim 26, wherein generating the TCC message further comprises:

digitally signing, by the computing system, the smart contract using SignedData cryptographic message syntax to generate the TCC message; and binding, by the computing system, the chain code manifest to the TCC message via an attribute of the TCC message.

\* \* \* \* \*